INVENTORS
B. K. LIKENESS
D. E. WILCOX
BY Harry A. Herbert Jr
ATTORNEY
James S. Shannon
AGENT United States Patent Office 3,570,315
Patented Mar. 16, 1971

3,570,315
FLOTATION TECHNIQUE FOR CALIBRATION OF LOW-LEVEL ACCELEROMETERS
Barry Karl Likeness, Atherton, and Doyle E. Wilcox, Hacienda Heights, Calif., assignors to the United States of America as represented by the Secretary of the Air Force
Filed Aug. 11, 1969, Ser. No. 860,135
Int. Cl. G01p 21/00
U.S. Cl. 73—432
6 Claims

ABSTRACT OF THE DISCLOSURE

A technique for counteracting the adverse effects of the earth's gravitational field on the laboratory calibration of low-level accelerometers. The one-$g$ force of the gravitational field is wholly or partly compensated as desired by immersing the proof mass of the accelerometer in a stationary dense gas which, in accordance with Archimedes principle, produces a buoyant force on the proof mass equal to the weight of the displaced gas and acting parallel and opposite to the gravitational force. The accelerometer and flotation fluid are contained in a sealed chamber having means for controlling the chamber volume and thereby the pressure and density of the gas. A servo system deriving its input from a gas density sensor in the chamber actuates the chamber volume control to automatically maintain the gas density constant at a selected value.

BACKGROUND OF THE INVENTION

The invention relates to the field of instrument calibration, particularly the calibration of low-level accelerometers.

The major application of accelerometers to space programs is monitoring of the high thrust levels achieved during launch from the earth. The acceleration levels range typically from one $g$ to 15 $g$. These relatively high level accelerometers have been test-proven both in the laboratory and operationally.

Recent trends in aerospace research have indicated a future requirement for accelerometers that will measure acceleration levels that may range from $10^{-2}$ $g$ to $10^{-12}$ $g$ or even lower. Examples of various space missions requiring measurements of these levels are:

(1) Optimum interplanetary trajectories will require thrust accelerations ranging from $10^{-2}$ $g$ to $10^{-5}$ $g$.

(2) Exotic (e.g. electric, nuclear) propulsion units for deep space missions will develop thrust accelerations from $10^{-5}$ $g$ to $10^{-9}$ $g$.

(3) Gravity-gradient measurements will have equivalent acceleration levels from $10^{-6}$ $g$ to $10^{-8}$ $g$.

(4) Trajectory perturbations due to external disturbances such as aerodynamic and solar pressure, magnetic and electrical interactions with ambient fields, micrometeorites, etc., and vehicle dynamics will produce accelerations ranging from $10^{-5}$ $g$ to $10^{-12}$ $g$.

A laborator test is needed to verify the performance of instruments of this degree of sensitivity.

The basic limitation to laboratory calibration techniques of low-level accelerometers is the presence of the earth's gravitational field. This field introduces a one-$g$ force or equivalent acceleration in the direction of the laboratory local vertical which must be compensated for by rebalance forces generated by the accelerometer. This rebalance or support force will introduce errors and uncertainties due to the nonuniformity of the support force, and the nonorthogonality of the instrument's sensitive axes. Present day state-of-the-art fabrication techniques can reduce these errors to a level typically from $10^{-4}$ $g$ to $10^{-5}$ $g$, and test procedures have been developed that can determine their value to a precision approaching $10^{-6}$ $g$.

These performance levels fall short of the desired $10^{-7}$ $g$ to $10^{-9}$ $g$ levels that will soon be required for this class of instrument. In addition, during these calibration procedures, the instrument is actually operating at a one-$g$ level. This is many orders of magnitude larger than will be encountered during a space mission: thus the instrument would be rescaled before launch to operate at the lower levels expected. This rescaling procedure may invalidate the calibration results obtained with the instrument operating at a one-$g$ level.

For these reasons it is desirable to compensate for the earth's one-$g$ force with a rebalance force that is independent of the accelerometer. The instrument could then be calibrated while operating at the same force levels that would be encountered during a space mission.

SUMMARY OF THE INVENTION

In accordance with the invention the earth's one-$g$ force on the accelerometer is compensated with a rebalance force that is independent of the accelerometer by immersing the accelerometer proof mass in a stationary dense gas. In accordance with Archimedes principle, the presence of the gas produces a net force on the proof mass which is antiparallel to the earth's gravitational force and is equal in magnitude to the weight of the gas displaced. For a proof mass that is small with respect to the radius of the earth so that the gravitational force $g$ can be considered constant over the volume of the fluid displaced the buoyancy force $\vec{b}$ is given by $$\vec{b} = \bar{\rho}_f V_m \vec{g}$$

where
$\bar{\rho}_f$ is the mean density of the fluid displaced,
$V_m$ is the volume of the proof mass, and
$g$ is the earth's gravitational force.

Again assuming $g$ to be constant over the volume of the proof mass, the weight $\vec{w}$ of the proof mass in a vacuum is given by $$\vec{w} = \bar{\rho}_m V_m \vec{g}$$

where $\bar{\rho}_m$ is the mean density of the proof mass.

The net force $\vec{w}'$ acting on the proof mass due to the gravitational field and the flotation fluid is then $$\vec{w}' = \vec{w} + \vec{b}$$
$$= (\bar{\rho}_m - \bar{\rho}_f) V_m \vec{g}$$
$$= \left(1 - \frac{\bar{\rho}_f}{\bar{\rho}_m}\right) \bar{\rho}_m V_m \vec{g}$$
$$= B \cdot \vec{w}$$

where $B = (1 - \bar{\rho}_f/\bar{\rho}_m)$ is defined as the flotation factor. By controlling the density of the flotation fluid, B may be made zero, positive, or negative. If the fluid mean density equals the proof mass mean density, $B = 0$ and the net force $\vec{w}'$ acting on the proof mass due to the earth's gravitational field is zero, thus simulating the zero-$g$ conditions on an orbiting body or at space locations remote from the earth or other large mass. Flotation fluid densities less than the proof mass density produce positive values of B ranging between zero and unity and simulate effective gravitational fields ranging between zero and one $g$. On the other hand, fluid densities greater than the proof mass density produce net forces on the proof mass opposite in direction to the force produced by the gravitational field and, in effect, reverse the effective gravitational field.

The above control of the effective gravitational field acting on an accelerometer under test is accomplished in accordance with the invention by placing the instrument in a sealed chamber filled with a stationary dense gas, such as sulfur hexafluoride ($SF_6$), under sufficient pressure to produce a gas density comparable to that of the accelerometer proof mass. Means are provided for varying the volume of the chamber and thereby the gas pressure for bringing the gas density into equality with, or in other desired relation to, the proof mass density. A servo system deriving its input from a gas density sensor in the chamber actuates the chamber volume control to automatically maintain the gas density constant at a selected value.

The technique is applicable to any accelerometer so constructed that the proof mass can be immersed in the flotation fluid. An accelerometer ideally suited to the technique is the three-axis electrically supported accelerometer (ESA). In this instrument the proof mass is a sphere supported at the center of a spherical cavity by electrostatic forces.

BRIEF DESCRIPTION OF THE DAWINGS

DETAILED DESCRIPTION

Figure 1:
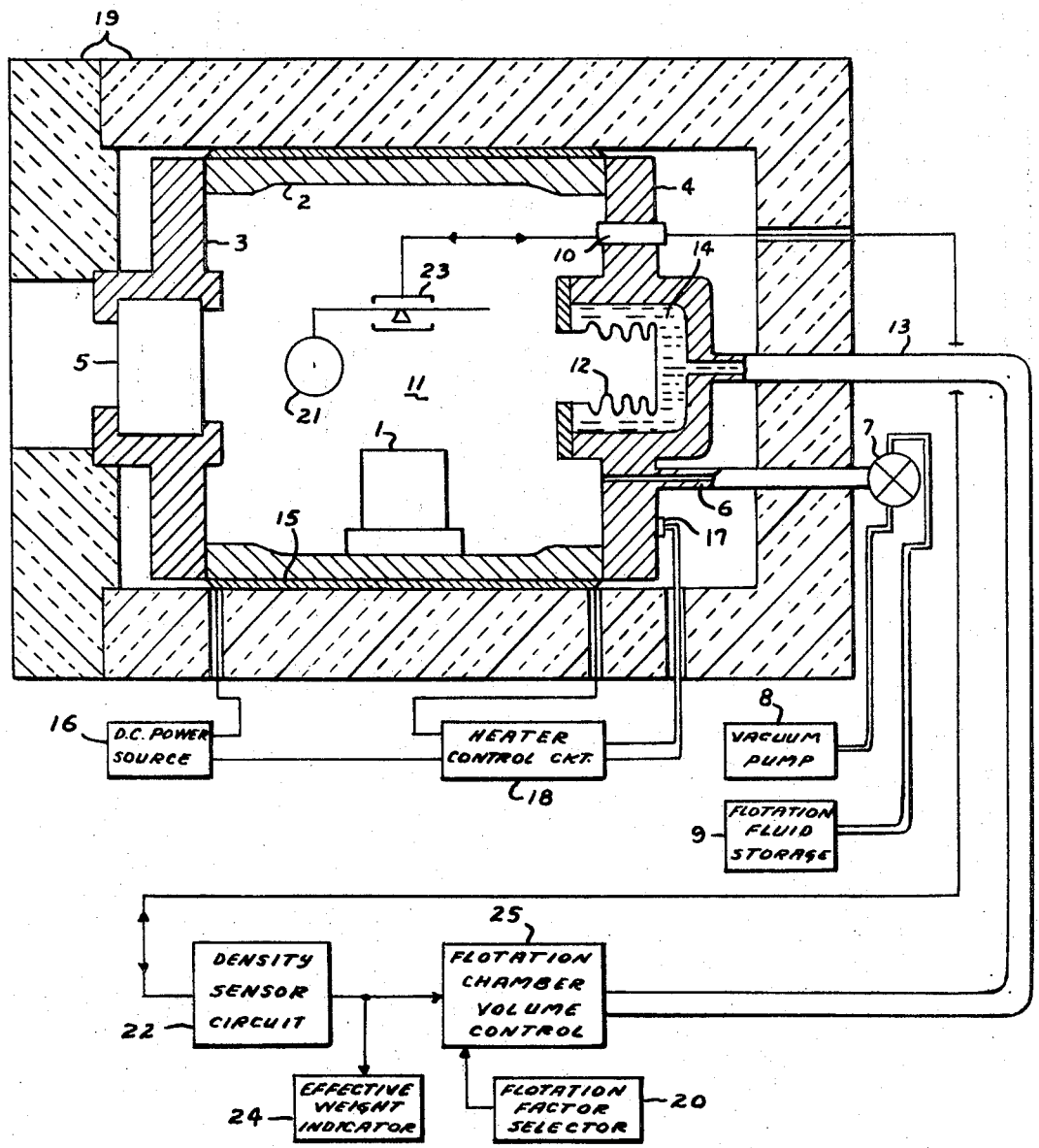
FIG. 1 shows an accelerometer test apparatus in accordance with the invention.
Figure 3:
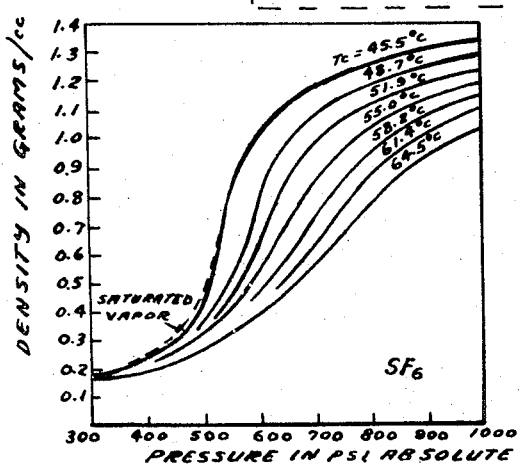
FIG. 3 shows a group of isothermal pressure-density curves for $SF_6$.

Referring to FIG. 1, block 1 represents an accelerometer installed in a gas flotation chamber for laboratory calibration in accordance with the described technique. The chamber is essentially an aluminum cylinder having a main body portion 2 and removable end plates 3 and 4. End plate 3 may be equipped with an observation window 5 if desired. End plate 4 contains an inlet-outlet port 6 which can be connected through valve 7 either to vacuum pump 8 for emptying the chamber of gas or to flotation fluid storage 9 for filling the chamber with the flotation fluid, preferably the dense gas sulfur hexafluoride, $SF_6$. This end plate is also provided with hermetically sealed electrical feedthroughs, such as 10, for electrical connections to gas density sensor balance 11 and accelerometer 1, the feedthroughs and connections for the latter not being shown. End plate 4 also contains means for controlling the volume of the chamber in the form of a bellows 12 the expansion of which is controlled hydraulically by a liquid admitted through tube 13 to the space 14 surrounding the outside of the bellows. In a typical example, the flotation chamber was designed to operate at pressures up to 750 p.s.i.a. and temperatures up to 60° C., thus permitting fluid densities as high as 1.2 when using $SF_6$, as seen in FIG. 3.

The flotation chamber is provided with a temperature controller for maintaining the temperature of the chamber and the flotation fluid at a constant pre-selected value in the range 30° C. to 60° C., for example. The principal reasons for temperature control are to prevent the flotation gas from liquifying, to reduce convection currents in the flotation gas, and to keep the volume of the chamber structure constant to avoid spurious changes in the mean density of the flotation resulting from temperature induced volume changes. The temperature control system comprises a noninductively wound heating coil 15 of copper wire surrounding the chamber, a source of power 16, and a temperature sensor 17 and control circuit 18 for controlling the current flow through the heating coil. To further maintain uniformity of temperature, the entire chamber structure is surrounded by an insulating jacket 19 made of a suitable insulating material such as styrofoam.

The chamber is also provided with a servo-control loop for automatically holding the flotation factor B for the accelerometer 1 proof mass constant at a value preset into the control loop by the flotation factor selector 20. The control loop comprises a gas density sensor in the form of a microbalance 11 having a proof mass 21 immersed in the flotation gas. The microbalance measures the effective weight of the proof mass, which is its vacuum weight less the buoyant force on the mass produced by the flotation gas, and produces a direct voltage at the output of density sensor circuit 22 proportional to this effective weight. The proof mass 21 should preferably have the same density as the proof mass of the accelerometer under test and for greatest accuracy the two proof masses should be identical. However, a balance proof mass having a density different from that of the accelerometer proof mass may be used provided the difference is taken into account in the calibration of flotation factor selector 20. The balance 11 operates on the principle of direct current torque rebalance, block 23 representing collectively the signal pickoff for supplying an input signal to the density sensor circuit 22 and the rebalance torque device energized from circuit 22 both of which are necessary in such balances. The output voltage of circuit 22 is indicated by a voltmeter 24 which may be calibrated to read the effective weight of the proof mass or the flotation factor B, or both. The difference between the circuit 22 output voltage and a bias voltage representing the desired flotation factor B and produced by flotation factor selector 20 is derived in flotation chamber volume control 25 and applied as an error signal to an electromechanical servo system which hydraulically operates bellows 12. Any departure of the circuit 22 output voltage from equality with the preset bias voltage produces an error signal which changes the volume of the chamber and thereby the gas density, through the action of bellows 12, in such direction as to bring the output voltage of circuit 22 back into equality with the bias voltage. Therefore the system operates to maintain a constant effective weight $w'$ for the proof mass, i.e. a constant flotation factor B equal to that called for by the selector 20. When the selector is set for $B=0$, represented by zero bias, the effective weight $w'$ of the proof mass is zero and the accelerometer is effectively in a zero-$g$ environment.

Figure 2:
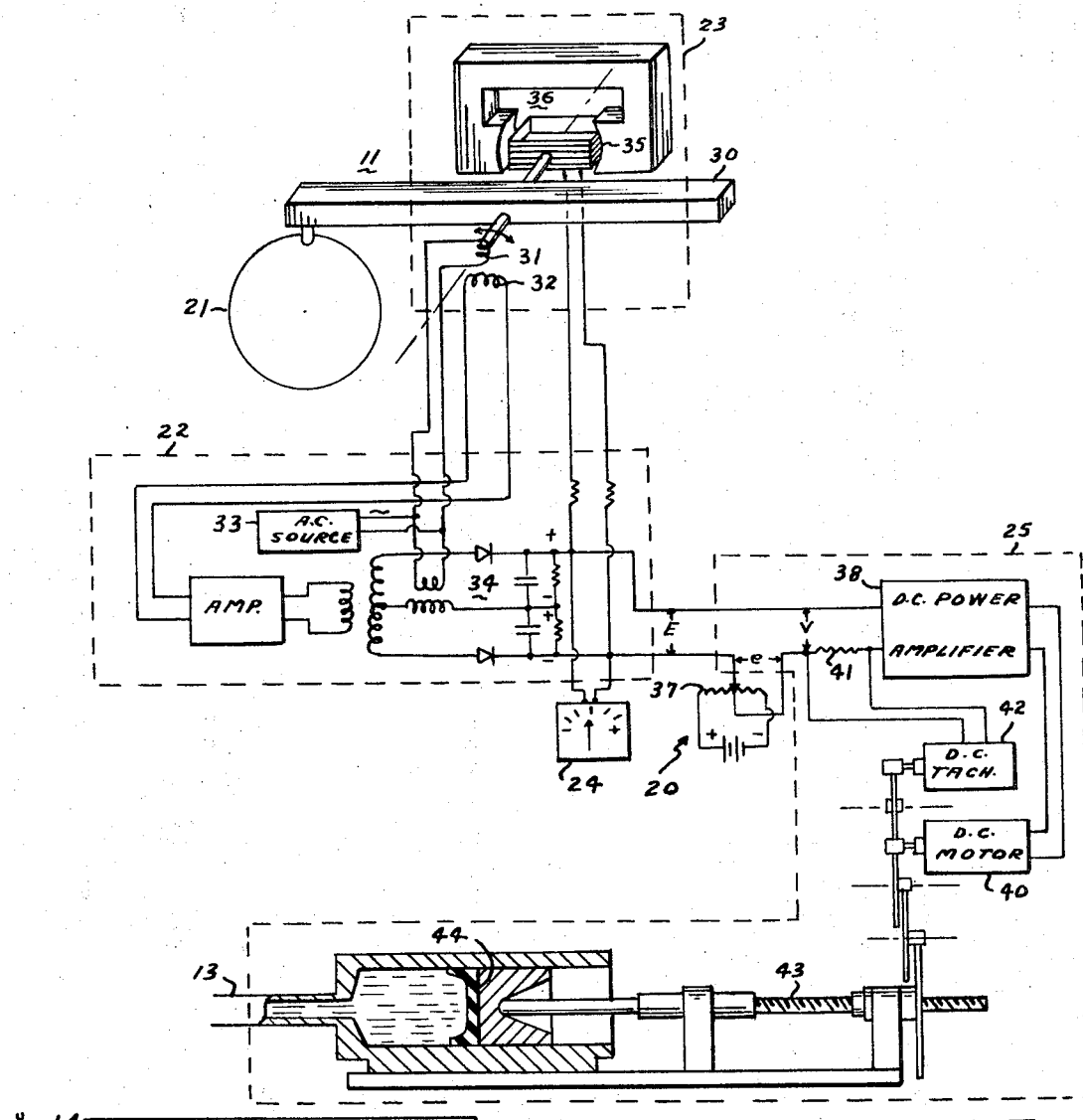
FIG. 2 shows the gas density control servo system of FIG. 1 in more detail.

A control loop cable of acting in the above-described manner may be realized in various equally effective ways following standard servomechanism techniques. One suitable embodiment is shown schematically in FIG. 2 in which correspondingly numbered blocks identify the apparatus represented by blocks 22, 23 and 25 of FIG. 1. Referring to FIG. 2, the microbalance 11 has a pivoted beam 30 at one end of which is attached the balance proof mass 21. The beam should be so constructed that the net torque about its pivot due to the buoyancy of the flotation gas in which it is immersed is zero. Windings 31 and 32 constitute the balance signal pickoff, winding 31 being energized from source 33. When beam 30 is in its horizontal or neutral position, the coil 31, which rotates with the beam, is at right angles to stationary coil 32 and no signal is induced in the latter. Any rotation of the beam from its neutral position results in a signal in coil 32 directly related in amplitude to the amount of rotation and having the same or opposite phase relative to source 33 depending upon the direction of rotation. The signal, after amplification, is rectified in phase sensitive rectifier 34 to produce a proportionate voltage E of the correct polarity to send a current through winding 35 of torque producing device 36 in the proper direction to oppose the rotation of the beam from its neutral position. The amount of rotation of the beam from its neutral position and the value of voltage E are directly related to the effective weight of mass 21; however, with sufficient gain in the system, the maximum rotation of the beam can be made very small so that the beam remains essentially in its horizontal position for all values of the effective weight of mass 21. Voltmeter 24 indicates the value of E and, as stated above, can be calibrated to read the effective weight of the mass, or the value of the flotation factor B, or both.

The flotation factor selector 20 of FIG. 1 is in the form of a center tapped potentiometer 37 producing an adjustable bias voltage $e$ of either polarity. An error signal $V=E-e$ is applied to the input of direct current power amplifier 38 which drives direct current servo motor 40 in either direction depending upon the polarity of the error signal. The speed of motor 40 is made proportional to the error signal V by means of a negative feedback voltage proportional to speed which is developed across resistor 41 by D.C. tachometer 42. Motor 40, acting through suitable reduction gearing and screw 43, increases or decreases the pressure on piston 44 thereby increasing or decreasing the pressure in the hydraulic fluid acting on the outside of bellows 12 to control the flotation chamber volume. This changes the density of the flotation gas in such direction as to bring E into equality with $e$ and reduce V to zero. In this manner, the flotation factor B and the effective weight of proof mass 21 is held constant at a value determined by the magnitude and polarity of $e$. Changing the polarity of $e$ changes polarity of the flotation factor B. Since the values of B normally of interest are zero and the positive values lying between zero and unity, only one polarity of $e$ is normally used. Negative values of B represent buoyancy greater than the vacuum weight of the proof mass and accordingly a negative effective weight which would be evidenced by an E polarity opposite to that for a positive B. When $e=0$, both B and E equal zero and the vacuum weight $w$ of the proof mass is just balanced by the buoyant force of the flotation gas making the effective weight $w'$ zero, as in a zero-gravity environment.

The flotation technique described herein is fully compatible with standard dividing head and tilt table procedures for producing the low level calibrating inputs to the accelerometer as small components of the earth's gravitational force in the direction of the instrument's sensitive axis.

We claim:

1. Apparatus for reducing the calibration error for low-level accelerometers due to earth's gravitational field, said apparatus comprising: means providing a gas tight chamber in which the accelerometer to be calibrated is placed; a fixed mass of a dense gas in said chamber; and externally actuatable means for changing the volume of said chamber to adjust the mean density of said gas to any value in a range of values including the mean density of the proof mass of said accelerometer.

2. Apparatus as claimed in claim 1 in which said gas is sulfur hexafluoride.

3. Apparatus as claimed in claim 1 in which said externally actuatable means for changing the volume of said chamber comprises a gas tight bellows located in a wall of the chamber and means for applying hydraulic pressure to the outside of said bellows for controlling the expansion of the bellows.

4. Apparatus as claimed in claim 3 and in addition a gas density sensor in said chamber producing an output signal proportional to the density of said gas, and means for controlling said hydraulic pressure applying means in accordance with the output of said gas density sensor.

5. Apparatus as claimed in claim 4 in which said gas density sensor is a sensitive balance arranged to weigh in said gas a proof mass identical to the proof mass of said accelerometer and having an output signal proportional to the weight of said balance proof mass; and in which said means for controlling the hydraulic pressure applying means in accordance with the output of the gas density sensor comprises means producing a presettable bias signal and means for applying the difference between the balance output signal and said bias signal as an actuating signal to said hydraulic pressure applying means.

6. Apparatus as claimed in claim 5 and in addition means for maintaining said chamber and its contents at a preset constant temperature above the liquifying temperature of said gas.

References Cited

UNITED STATES PATENTS

| | | | |
|---|---|---|---|
| Re. 26,784 | 2/1970 | Paynter et al. | 73—432(SIM) |
| 3,083,473 | 4/1963 | Luton | 73—432(SIM)X |
| 3,302,463 | 2/1967 | Marfone et al. | 73—432(SIM) |
| 3,436,955 | 4/1969 | Wilcher | 73—4 |
| 3,464,255 | 9/1969 | Davidson et al. | 73—1(D) |
| 3,495,426 | 2/1970 | Huot | 73—4(D) |

LOUIS R. PRINCE, Primary Examiner

H. C. POST III, Assistant Examiner

U.S. Cl. X.R.

73—1